United States Patent
Kobayashi et al.

(10) Patent No.: US 6,896,417 B2
(45) Date of Patent: May 24, 2005

(54) HOLLOW CAST ARTICLE WITH SLIT, METHOD AND APPARATUS FOR PRODUCTION THEREOF

(75) Inventors: Masayuki Kobayashi, Kurobe (JP); Hideki Takeda, Sendai (JP); Etsuji Sugita, Tokyo (JP)

(73) Assignee: YKK Corporation, Tokyo (JP)

( * ) Notice: Subject to any disclaimer, the term of this patent is extended or adjusted under 35 U.S.C. 154(b) by 166 days.

(21) Appl. No.: 10/265,594

(22) Filed: Oct. 8, 2002

(65) Prior Publication Data

US 2003/0068136 A1 Apr. 10, 2003

(30) Foreign Application Priority Data

Oct. 9, 2001 (JP) ........................................ 2001-311049

(51) Int. Cl.⁷ ................................................ G02B 6/38
(52) U.S. Cl. .............................. 385/72; 385/70; 385/52; 385/58; 385/60; 385/65; 385/66; 385/77; 385/78; 385/84; 385/138; 264/1.1; 264/1.2; 264/1.5; 264/2.1; 264/2.2; 264/2.3
(58) Field of Search .............................. 385/72, 70, 52, 385/58, 60, 65, 66, 77, 78, 84, 138; 264/1.1, 1.2, 1.5, 2.1, 2.2, 2.3

(56) References Cited

U.S. PATENT DOCUMENTS

| | | | | |
|---|---|---|---|---|
| RE31,515 E | * | 2/1984 | Heldt | 385/87 |
| 4,714,318 A | * | 12/1987 | Hayashi et al. | 385/74 |
| 5,239,603 A | | 8/1993 | Sonoda et al. | 385/70 |
| 5,390,270 A | * | 2/1995 | Hanzawa et al. | 385/81 |
| 5,446,817 A | * | 8/1995 | Kardos et al. | 385/72 |
| 5,621,834 A | * | 4/1997 | Anderson et al. | 385/72 |
| 5,992,295 A | * | 11/1999 | Noda et al. | 92/88 |
| 6,213,649 B1 | | 4/2001 | Omiya et al. | 385/60 |

FOREIGN PATENT DOCUMENTS

| | | | |
|---|---|---|---|
| JP | 6-27348 | 2/1994 | 385/70 |
| JP | 09-090169 | 4/1997 | 385/70 |
| JP | 10-311923 | 11/1998 | 385/60 |

* cited by examiner

Primary Examiner—Dean A. Reichard
Assistant Examiner—Anton Harris
(74) Attorney, Agent, or Firm—Finnegan, Henderson, Farabow, Garrett & Dunner, L.L.P.

(57) ABSTRACT

In the production of a hollow cast article having a slit, the release of a hollow cast product from a mold is carried out while opening the hollow cast product. In one embodiment, a core provided with recessed parts (or projected parts) formed in a slit forming part (or an outer peripheral part) is used and the drawing out of the core from the hollow cast product is carried out while opening the hollow cast product by means of the recessed parts (or projected parts) mentioned above. By such a method, a hollow cast article having a slit and projected parts (or recessed parts) formed in a slit part or/and an inner peripheral part thereof is obtained. In the case of the use of a core having a slit forming part of a taper-shaped ridge of which width gradually decreasing from a large width at one end to a small width at the other end, the core is drawn out from the hollow cast product in the direction to the other end of small width to open the hollow cast product by means of the slit forming part of the taper-shaped ridge.

24 Claims, 13 Drawing Sheets

HOLLOW CAST ARTICLE WITH SLIT, METHOD AND APPARATUS FOR PRODUCTION THEREOF

BACKGROUND OF THE INVENTION

1. Field of the Invention

This invention relates to a hollow cast article having a slit and a method and apparatus for the production thereof. More particularly, this invention relates to a casting technique usable in the production of a hollow cast article having a slit, particularly optical connector parts such as a sleeve for optical connector ferrules and a conversion sleeve for ferrules having different diameters, by casting, particularly by metal mold casting of an amorphous alloy (metal glass).

2. Description of the Prior Art

As a typical example of a hollow cast article which has a slit and which requires high dimensional accuracy, optical connector parts such as a sleeve for optical connector ferrules and a conversion sleeve for ferrules having different diameters may be cited.

A sleeve for optical connector ferrules is used to connect ferrules each having an optical fiber already inserted and joined therein by abutting ends of the ferrules against each other. In general, the connection of the optical fibers are attained by inserting the ferrules into a split sleeve through the opposite ends thereof and then abutting the ends of the ferrules against each other, thereby allowing the leading ends of the optical fibers to be abutted and connected in the axial alignment state (see Japanese Patent Application, KOKAI (Early Publication) No. (hereinafter referred to briefly as "JP-,A") JP-6-27348,A and JP-10-311923,A, for example). On the other hand, a conversion sleeve for ferrules having different diameters is used to connect ferrules having different diameters by abutting ends of the ferrules against each other (see JP-9-90169,A, for example).

In the production of the hollow cast article having a slit, such as the sleeve for optical connector ferrules and the conversion sleeve for ferrules having different diameters as mentioned above, if the draft angle of a core which forms a hollow portion is in the range of 0° to 5°, the problem will be incurred that the core cannot be drawn out from a cast product during the ejection step. If the core is forcedly drawn out from the cast product, another problem will be incurred that part of a cast material adheres to the surface of the core and the resultant cast product has the coarsened inside surface. Particularly when the casting material is an amorphous alloy (metal glass), it exhibits excellent transferability capable of faithfully reproducing the contour of a cavity of a mold. As a result, it is possible to produce an amorphous alloy cast product satisfying dimensional prescription, dimensional accuracy, and surface quality. However, this means that the core is in the state of shrink-fit into the cast product due to the thermal shrinkage thereof and there is little gap between the surface of the cavity of the mold and the cast material. This fact, therefore, poses the problem that when the core is drawn out from the cast product, the core rubs against the inside surface of the hollow cast product and part of the cast material adheres to the entire surface of the core in the state of thin film due to the properties of the amorphous alloy that it is hard but easily deformable (remarkable plastic deformation under multi-axial stress). As a result, scratch marks remain in the inside surface of the hollow cast product.

In such a case, the hollow cast article has a coarsened inside surface (increased surface roughness) even when the surface of the core to be used is smooth. This is a fatal defect to the hollow cast article such as optical connector parts mentioned above which require the smoothness of the inside surface.

SUMMARY OF THE INVENTION

It is, therefore, a fundamental object of the present invention to produce with high productivity at a low cost a high quality hollow cast article having a slit and a smooth inside surface corresponding to the smoothness of the surface of a core, which can be easily ejected from a mold after casting even if a core member to be used in the casting of the hollow cast article having a slit has no draft angle and thus can be prevented from the adhesion of a cast material to the surface of the core during the step of ejection.

A further particular object of the present invention is to provide a method and apparatus which allow a hollow molded article satisfying a predetermined shape, high dimensional accuracy and surface quality to be molded by a simple process even when the article is an amorphous alloy hollow molded article having a slit and, therefore, enable to provide an inexpensive amorphous alloy hollow molded article having a slit and excelling in the durability, mechanical strength, resistance to impact and the like, particularly a sleeve for optical connector ferrules and a conversion sleeve for ferrules having different diameters.

To accomplish the objects mentioned above, the first aspect of the present invention provides a hollow cast article having a slit. A first embodiment thereof is characterized by the fact that at least one of a recessed part and a projected part is formed in at least one of a slit part and an inner peripheral part. A second embodiment is characterized by the fact that the slit is formed in a tapered shape such that the width of the slit gradually changes from a large width at one end to a small width at the other end. Particularly, the present invention provides a sleeve for optical connector ferrules and a conversion sleeve for ferrules having different diameters.

In accordance with the second aspect of the present invention, there is provided a method for the production of a hollow cast article having a slit. The fundamental embodiment of the method is characterized by the fact that the release of a hollow cast product from a mold is carried out while opening the hollow cast product. In accordance with a preferred first embodiment, a core provided with at least one of a projected part and a recessed part formed in at least one of a slit forming part and an outer peripheral part thereof is used and the drawing out of the core from a hollow cast product is carried out while opening the hollow cast product by means of the projected part or/and the recessed part mentioned above. In accordance with a preferred second embodiment, a core provided with a slit forming part of a taper-shaped ridge having the width gradually decreasing from a large width at one end to a small width at the other end is used and the drawing out of the core from a hollow cast product is carried out while opening the hollow cast product by means of the slit forming part of the taper-shaped ridge mentioned above.

Furthermore, the third aspect of the present invention provides an apparatus for the production of a hollow cast article having a slit, characterized by comprising a split mold provided with at least one cavity which defines the outer shape of an article aimed at and a core slidably disposed in the cavity of the mold in the longitudinal direction thereof, wherein the core is provided with at least one of a projected part and a recessed part or a taper-shaped ridge formed in at least one of a slit forming part and an outer peripheral part.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
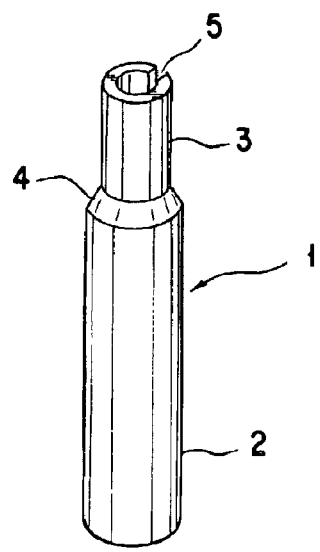
FIG. 1 is a schematic perspective view illustrating an embodiment of a conversion sleeve for the ferrules having different diameters as a hollow cast article having a slit according to the present invention.

The production of a hollow cast article having a slit according to the present invention is characterized in that, for the purpose of easily ejecting a core member to be used from a mold after casting, the release of a hollow cast product from the mold is carried out while opening the hollow cast product. Preferably, a core provided with a projected part or/and a recessed part formed in a slit forming part or/and an outer peripheral part is used and the drawing out of the core from the hollow cast product is carried out while opening the hollow cast product by means of the projected part or/and the recessed part mentioned above. Specifically, by using such a core, a recessed part or a projected part corresponding to the projected part or the recessed part mentioned above is formed in the resultant cast product. When the core is drawn out from the hollow cast product, since the recessed part or the projected part runs up on a step portion of the projected part or the recessed part of the core and the slit part is opened or spread due to the elasticity of the hollow cast product, a gap is formed between the surface of the core and the inner surface of the hollow cast product. Accordingly, the core can be easily drawn from the hollow cast product and the adhesion of the cast material to the surface of the core is effectively prevented. As a result, it is possible to produce a high quality hollow cast article having a smooth inside surface corresponding to the smoothness of the surface of the core with high productivity at a low cost and the durability of the core is improved. This holds good for the use of a core having a slit forming part of a taper-shaped ridge formed in such a manner that the width of the ridge gradually decreases from a large width at one end to a small width at the other. In this case too, it is possible to open a hollow cast product by means of the slit forming part of the taper-shaped ridge mentioned above when the core is drawn out from the hollow cast product.

In accordance with the method of the present invention, it is possible to provide a sleeve for optical connector ferrules or a conversion sleeve for ferrules having different diameters satisfying a predetermined shape, high dimensional accuracy and surface quality and excelling in the durability, mechanical strength, resistance to impact and the like.

Now, the present invention will be described more concretely below with reference to the attached drawings which illustrate some embodiments.

Figure 2:
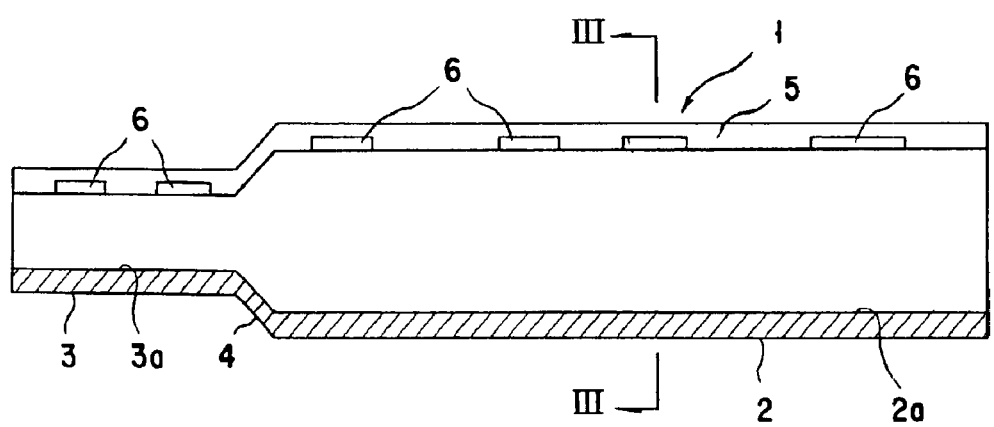
FIG. 2 is a schematic cross-sectional view of the conversion sleeve for the ferrules having different diameters shown in FIG. 1.
Figure 3:
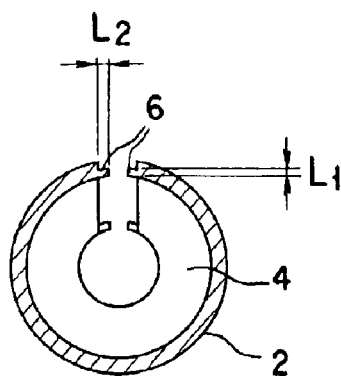
FIG. 3 is a cross-sectional view taken along the line III—III in FIG. 2.

FIG. 1 through FIG. 3 illustrate an embodiment of the conversion sleeve for the ferrules having different diameters, the sleeve being manufactured in accordance with the present invention. This conversion sleeve 1 comprises a large diameter part 2 having a large diameter through-hole 2a formed therein to which a large diameter ferrule (not shown) having an optical fiber inserted and fixed therein is fitted and a small diameter part 3 having a small diameter through-hole 3a formed therein to which a small diameter ferrule (not shown) similarly having an optical fiber inserted and fixed therein is fitted, the large diameter part 2 and the small diameter part 3 being integrally formed of a metal, preferably an amorphous alloy, in the connected state such that the large diameter part 2 is connected and transformed to the small diameter part 3 with a gentle slope of a predetermined angle (slope) through the medium of a gently tapered hole part 4.

The conversion sleeve 1 is provided with a slit 5 formed throughout the entire length thereof in its longitudinal direction from an end of the large diameter part 2 to the opposite end of the small diameter part 3. Further, a plurality of projected parts 6 are formed on the opposed slit faces alternately (or as faced each other) in conformity with the recessed parts formed in the core as described hereinafter. Since these projected parts 6 formed on the slit part do not touch each other even when the slit is opened (or spread) and closed (or retracted), they do not exert any harmful influence on the performance of the product (when the optical connector part is a conversion sleeve for the ferrules having different diameters, the retaining force and optical properties of ferrules). However, the thickness, $L_1$, of the projected parts 6 (or the recessed parts of the core) should be not more than the thickness of the sleeve 1. When the thickness of the sleeve 1 is 0.3 mm, for example, the thickness, $L_1$, of the projected parts 6 (or the recessed parts of the core) is preferred to be about 0.2 mm. The height, $L_2$, of the projected parts 6 (or the depth of the recessed parts of the core) is restricted from the width of the slit 5 and, in case a plurality of projected parts 6 are formed on the opposed slit faces as in this embodiment, is preferred to be not more than ½ of the slit width. In order to maintain the opened state until the extraction of the core, i.e. to extract the core without repeating the cycle of opening (spreading) and closing (retracing), it is preferable that the length of the projected parts 6 and the interval between the projected parts should not be the equal value.

Then, an example of the method for manufacturing the conversion sleeve for the ferrules having different diameters as mentioned above will be described with reference to FIG. 4 through FIG. 8.

Figure 4:
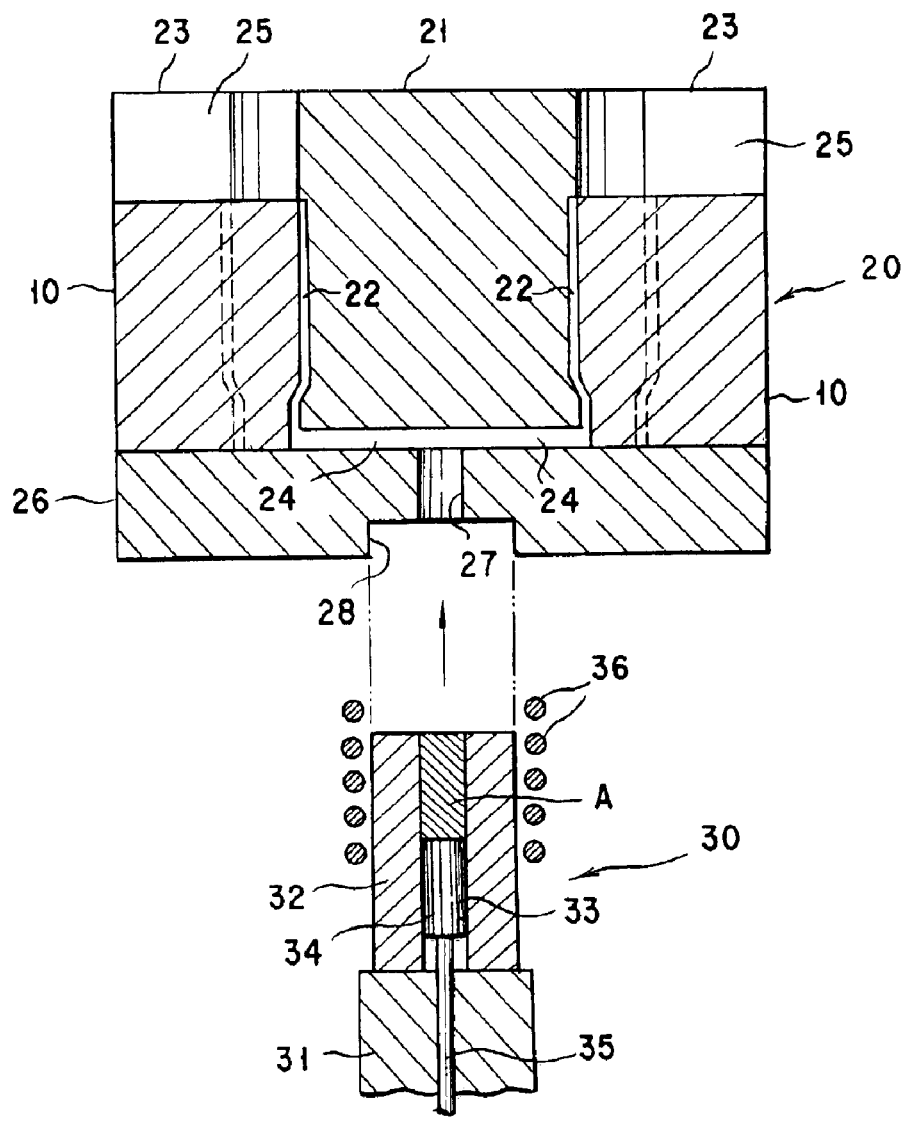
FIG. 4 is a fragmentary cross-sectional view schematically illustrating an embodiment of an apparatus for the production of the conversion sleeve for the ferrules having different diameters according to the present invention.

FIG. 4 schematically illustrates one mode of embodying an apparatus and method for the production of the conversion sleeve for the ferrules having different diameters mentioned above by the mold casting technique.

A forced cooling casting mold 20 is a split mold composed of a multi-split upper mold 21, a pressing mold 23, and a lower mold 26. The upper mold 21 has a plurality of molding cavities 22 formed therein and adapted to define the outside dimension of an sleeve. Inside these cavities 22, cores 11 of core members 10 for defining the inside dimension of the sleeve are disposed respectively. These cavities 22 intercommunicate through the medium of runners 24 such that the molten metal flows through the leading ends of respective runners 24 into the cavities 22. On the other hand, a sprue (through-hole) 27 communicating with the runners 24 mentioned above is formed at a pertinent position of the lower mold 26. Underneath the sprue 27 is formed a depression 28 which is shaped to conform with an upper part of a cylindrical raw material accommodating part or pot 32 of a melting vessel 30.

While the forced cooling casting mold 20 can be made of copper, copper alloy, cemented carbide or superalloy, and other metallic materials, it is preferred to be made of such material as copper or copper alloy which has a large thermal capacity and high thermal conductivity for the purpose of heightening the cooling rate of the molten metal poured into the cavities 22. The upper mold 21 may have disposed therein such a flow channel as allow flow of a cooling medium like cooling water or cooling gas.

Figure 5:
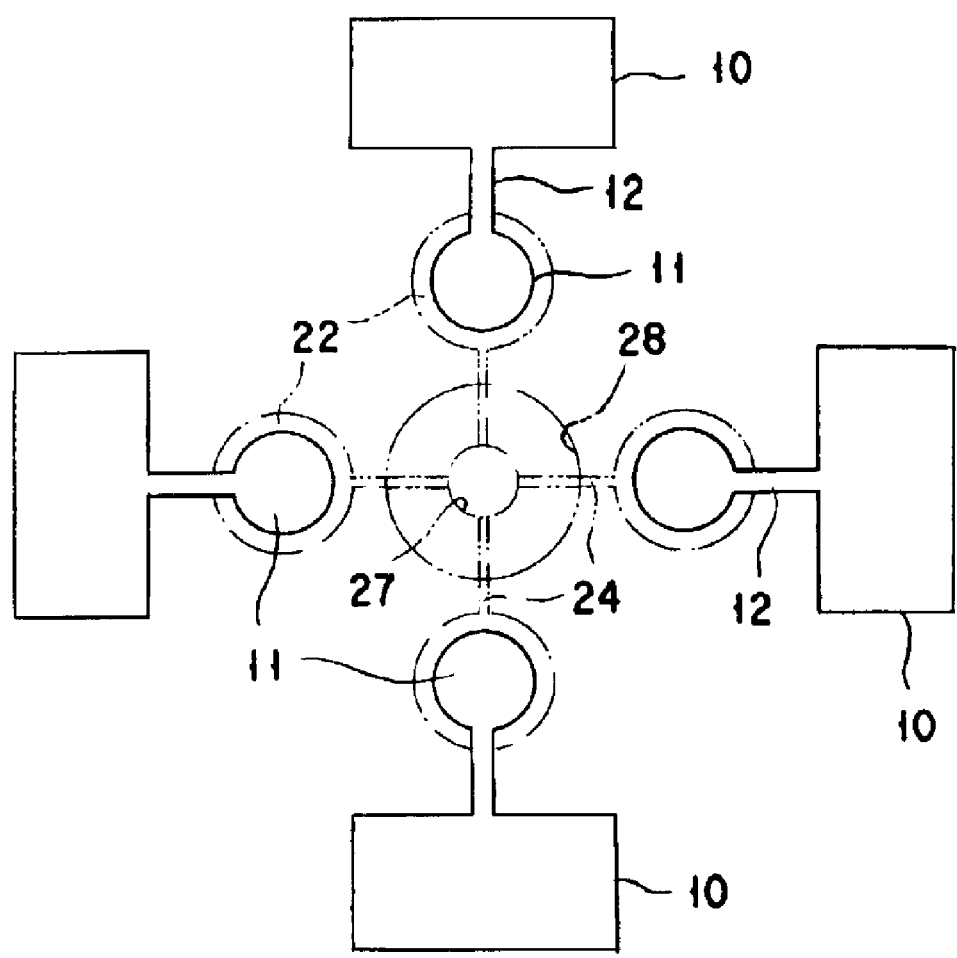
FIG. 5 is a schematic plan view illustrating an arrangement embodiment of a core member in the apparatus shown in FIG. 4.

Each core member 10 has a structure such that the core 11 having a contour conforming to the inside contour of the product is integrally formed in the leading end of a plate-shaped slit forming part 12 defining the shape of slit and recessed parts 13 having the width and depth mentioned above are formed in the sites of the slit forming part 12 close to the core at predetermined intervals. The arrangement of respective core members 10 is such that the cores 11 thereof are disposed symmetrically with respect to the sprue 27 as shown in FIG. 5. Although the embodiment shown in the diagram includes four core members 10, the number of core members may be arbitrary. The pressing mold 23 has a groove part 25 of the contour conforming to that of the core 11, as being clear from FIG. 6 which schematically illustrates the pressing mold in relation to one core member, and is disposed in such a manner that this groove part 25 is positioned just over the core 11. Accordingly, the core can be drawn upwardly while sliding in this groove part 25. Alternatively, part of the cast material may be ejected downwardly from the mold, thereby relatively sliding the core 11 upwardly to be drawn out therefrom.

The melting vessel 30 is provided in the upper part of a main body 31 thereof with the cylindrical raw material accommodating part 32 and is disposed directly below the sprue 27 of the lower mold 26 mentioned above in such a manner as to be reciprocated vertically. In a raw material accommodating hole 33 of the raw material accommodating part 32, a molten metal transferring member or piston 34 having nearly the same diameter as the raw material accommodating hole 33 is slidably disposed. The molten metal transferring member 34 is vertically moved by a plunger 35 of a hydraulic cylinder (or pneumatic cylinder) not shown in the diagram. An induction coil 36 as a heat source is disposed so as to encircle the raw material accommodating part 32 of the melting vessel 30. As the heat source, any arbitrary means such as one resorting to the phenomenon of resistance heating may be adopted besides the high-frequency induction heating. The material of the raw material accommodating part 32 and that of the molten metal transferring member 34 are preferred to be such heat-resistant material as ceramics or metallic materials coated with a heat-resistant film.

Incidentally, for the purpose of preventing the molten metal from forming an oxide film, it is preferred to dispose the apparatus in its entirety in a vacuum or an atmosphere of an inert gas such as Ar gas or establish a stream of an inert gas at least between the lower mold 26 and the upper part of the raw material accommodating part 32 of the melting vessel 30.

The production of the conversion sleeve for the ferrules having different diameters of the present invention is effected by first setting the melting vessel 30 in a state separated downwardly from the forced cooling casting mold 20 and then charging the empty space overlying the molten metal transferring member 34 inside the raw material accommodating part 32 with a raw material "A". The raw material "A" to be used may be in any of the popular forms such as rods, pellets, and minute particles.

Subsequently, the induction coil 36 is excited to heat the raw material "A" rapidly. After the fusion of the raw material "A" has been confirmed by detecting the temperature of the molten metal, the induction coil 36 is demagnetized and the melting vessel 30 is elevated until the upper end thereof is inserted in the depression 28 of the lower mold 26. Then, the hydraulic cylinder is actuated to effect rapid elevation of the molten metal transferring member 34 and injection of the molten metal through the sprue 27 of the forced cooling casting mold 20. The injected molten metal is advanced through the runner 24 introduced into the molding cavities 22 and compressed and rapidly solidified therein.

Figure 6:
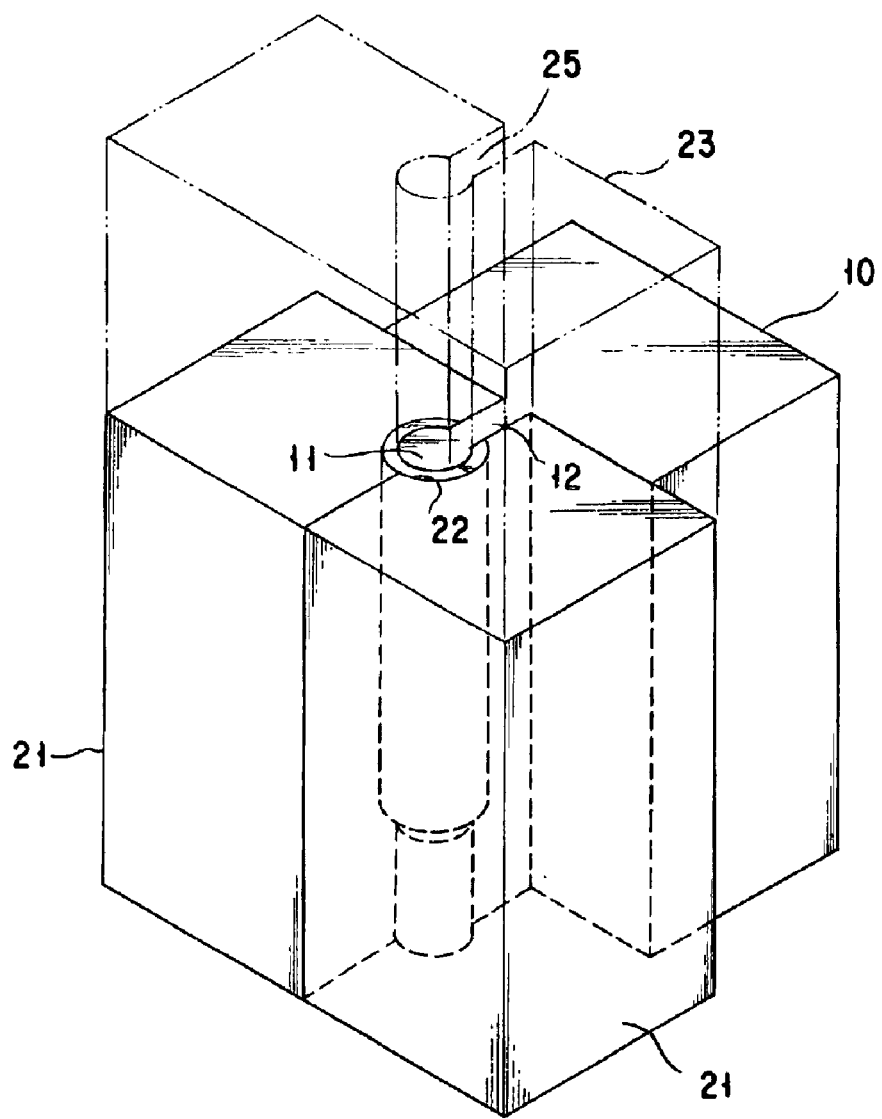
FIG. 6 is a fragmentary perspective view schematically illustrating an arrangement relation between the core member and an upper mold and a pressing mold in the apparatus shown in FIG. 4.
Figure 7:
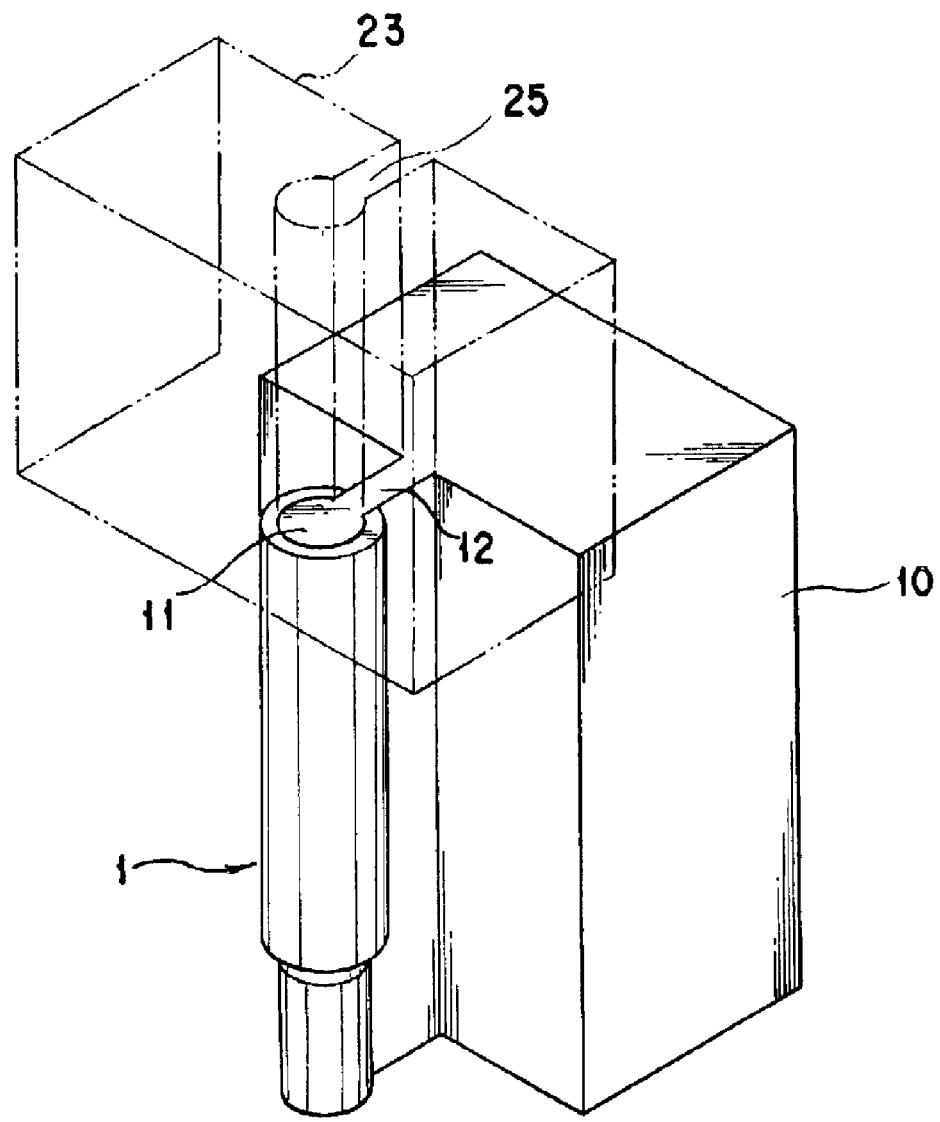
FIG. 7 is a fragmentary perspective view schematically illustrating an arrangement relation between the core member and the pressing mold after separation of the upper mold carried out after completion of the casting in the apparatus shown in FIG. 4.
Figure 8:
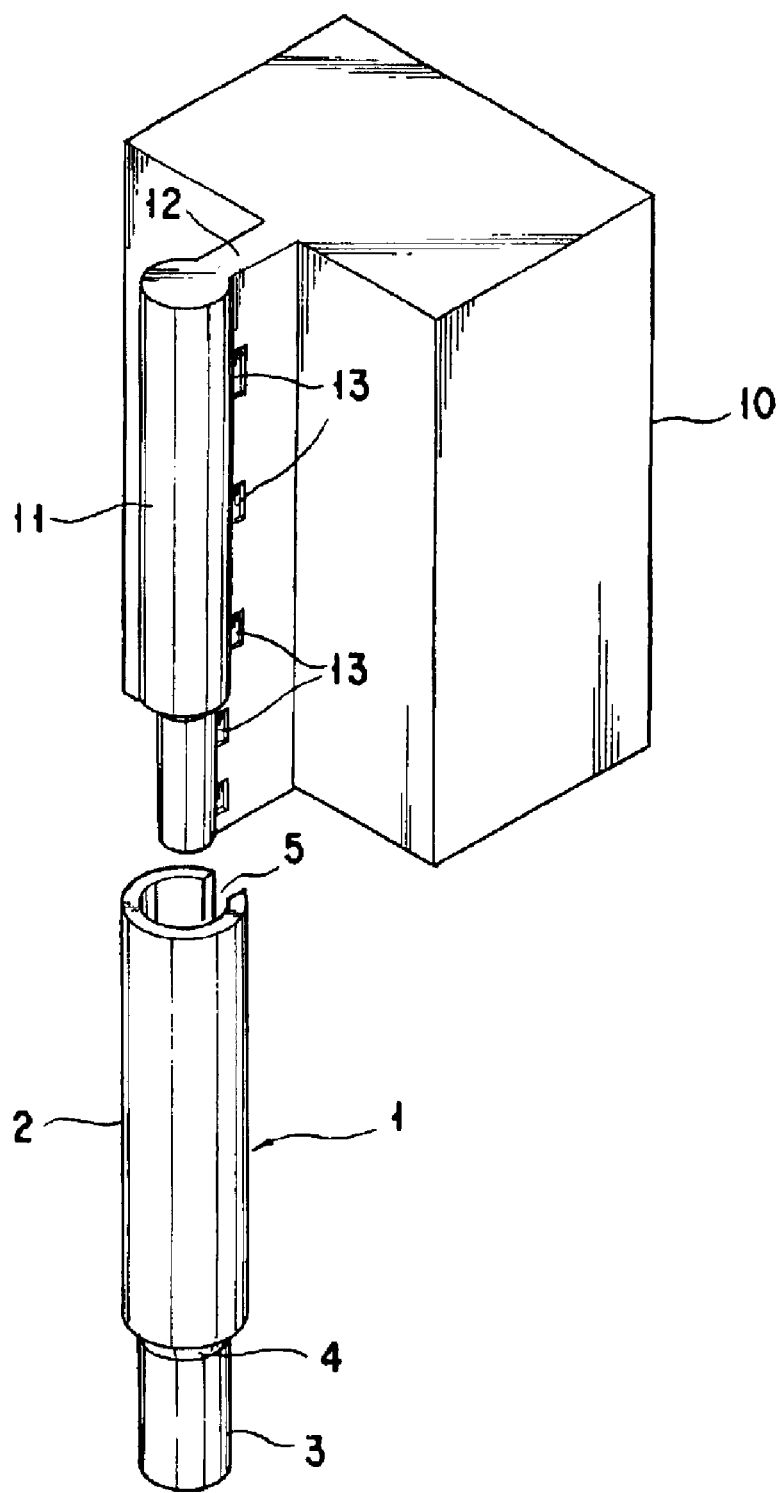
FIG. 8 is a perspective view schematically illustrating the state that the core member is drawn out from the conversion sleeve for the ferrules having different diameters after completion of the casting.

After completion of the casting, the melting vessel 30 is lowered and the upper mold 21 and the lower mold 26 are separated (the state shown in FIG. 6). Then, the multi-split upper mold 21 is divided in the state as shown in FIG. 7 to release the retaining force (external force) applied by the upper mold 21 to the cast conversion sleeve 1 for the ferrules having different diameters. At this stage the upper end face of the cast sleeve 1 abuts against the lower surface of the pressing mold 23 and the upward movement of the sleeve 1 is restrained. Accordingly, when drawing the core member 10 upward, the core 11 is drawn upwardly while sliding in the groove part 25 of the pressing mold 23 till the state as shown in FIG. 8. During this step, since the recessed parts 13 of the width and depth mentioned above are formed in the site of the slit forming part 12 approximating to the core of the core member 10 and thus the cast sleeve 1 has the projected parts 6 (see FIG. 2 and FIG. 3) formed in the slit faces in conformity with the recessed parts mentioned above, these projected parts 6 runs up on step portions of the recessed parts 13 of the core and the slit 5 is opened due to the elasticity of the hollow cast product. As a result, a gap is formed between the surface of the core 11 and the inner surface of the sleeve 1. Accordingly, the core 11 can be easily drawn from the cast product and the adhesion of the cast material to the surface of the core is effectively prevented. Thereafter, by severing runner parts from the sleeves 1 as a cast product and grinding the cut faces of the sleeves remaining after by the severance, the conversion sleeves 1 possessed of a smooth surface faithfully reproducing the cavity surface of the mold are obtained.

Figure 9:
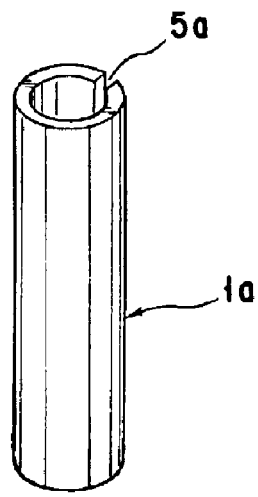
FIG. 9 is a schematic perspective view of an embodiment of a sleeve as the hollow cast article having a slit according to the present invention.
Figure 10:
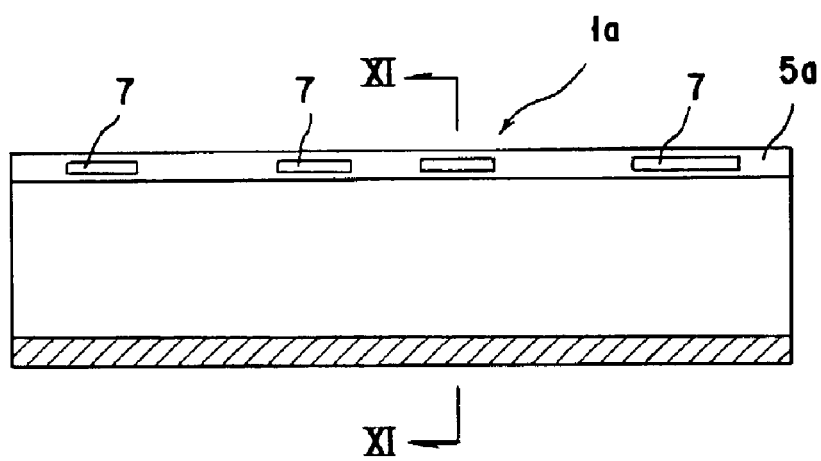
FIG. 10 is a schematic cross-sectional view of the sleeve shown in FIG. 9.
Figure 11:
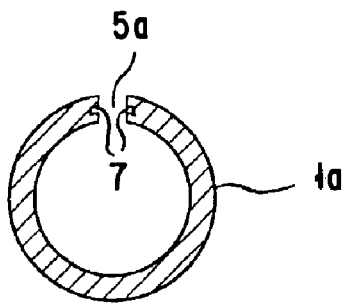
FIG. 11 is a cross-sectional view taken along the line XI—XI in FIG. 10.

FIG. 9 through FIG. 11 illustrate one embodiment of a sleeve 1a manufactured according to the present invention. This sleeve 1a is provided with a slit 5a formed throughout the entire length thereof in its longitudinal direction from one end to the other thereof. Further, a plurality of recessed parts 7 are formed in the opposed slit faces alternately (or as faced each other) in conformity with the projected parts formed on the core as described hereinbelow.

Although in this embodiment the recessed parts 7 are formed in the slit part of the sleeve and in the aforementioned embodiment the projected parts 6 are formed, any mode including exclusively the recessed parts 7, exclusively the projected parts 6, or the combination of these parts may be adopted. In any case, since these parts do not touch each other even when the slit is opened (or spread) and closed (or retracted), they do not exert any harmful influence on the performance of the product (when the optical connector part is a sleeve or a conversion sleeve for the ferrules having different diameters, the retaining force and optical properties of ferrules). Needless to say, however, the thickness of the recessed part 7 (or the projected part of the core) should be not more than the thickness of the sleeve 1a.

Figure 12A:
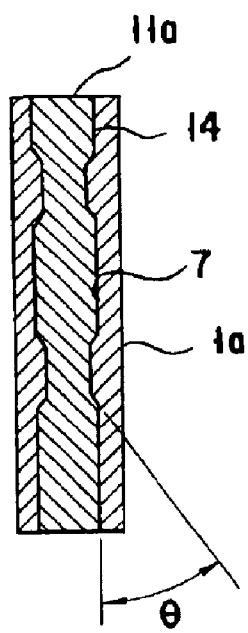
FIGS. 12A and 12B are fragmentary cross-sectional views schematically illustrating the relation between a core member and the sleeve after completion of the casting, FIG. 12A depicting a fragmentary vertically cross-sectional view and FIG. 12B depicting a fragmentary horizontally cross-sectional view of a slit portion, respectively.
Figure 12B:
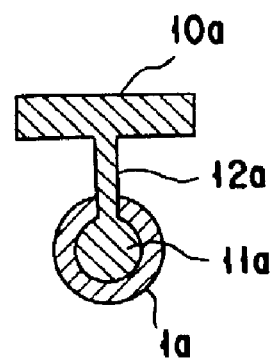
Figure 13A:
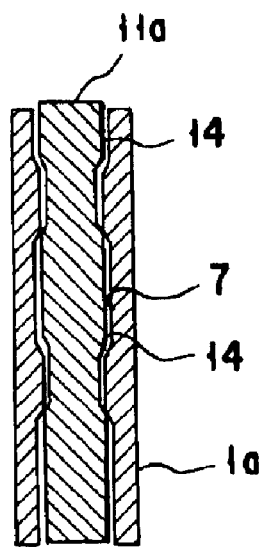
FIGS. 13A and 13B are fragmentary cross-sectional views schematically illustrating the state of the core in the course of drawing from the sleeve after completion of the casting, FIG. 13A depicting a fragmentary vertically cross-sectional view and FIG. 13B depicting a fragmentary horizontally cross-sectional view of the slit portion, respectively.
Figure 13B:
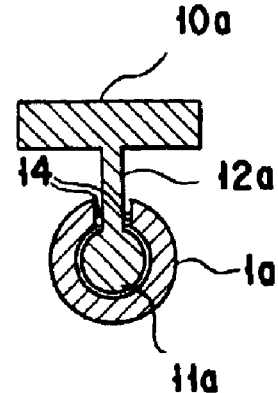
Figure 14A:
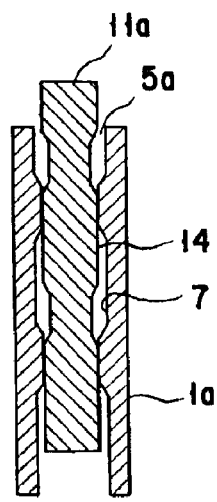
FIGS. 14A and 14B are fragmentary cross-sectional views schematically illustrating the state of the core in the course of drawing from the sleeve after completion of the casting, FIG. 14A depicting a fragmentary vertically cross-sectional view and FIG. 14B depicting a fragmentary horizontally cross-sectional view of the slit portion, respectively.
Figure 14B:
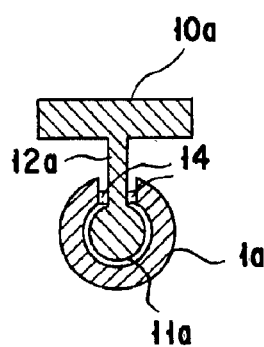

FIG. 12A through FIG. 14B illustrate schematically and partially the state of the core in the course of drawing from the sleeve 1a mentioned above after completion of the casting. FIG. 12A, FIG. 13A and FIG. 14A schematically illustrate the progress in cross-sectional change of the slit part and FIG. 12B, FIG. 13B and FIG. 14B schematically illustrate the relation between the core 11a and the sleeve 1a.

FIGS. 12A and 12B show the state that the upper mold is separated after completion of the casting. Thereafter, when the core member 10a is lifted as mentioned above, since the projected parts 14 formed in the sites of the slit forming part 12a close to the core of the core member 10a runs up on step portions of the recessed parts 7 of the sleeve 1a formed during the casting in conformity with the projected parts and the slit 5a is opened due to the elasticity of the hollow cast product, a gap is formed between the surface of the core 11a and the inner surface of the sleeve 1a, as shown in FIG. 13A and FIG. 13B. Accordingly, the core 11a can be drawn from the cast product as shown in FIG. 14A and FIG. 14B and the adhesion of the cast material to the surface of the core is effectively prevented. In order to smoothly effect the run-up of the projected parts on the step portions, the degree of inclination, θ, of the end portion of the projected part 14 (or recessed part 7) is preferred to be an acute angle, more preferably about 45°.

Figure 15:
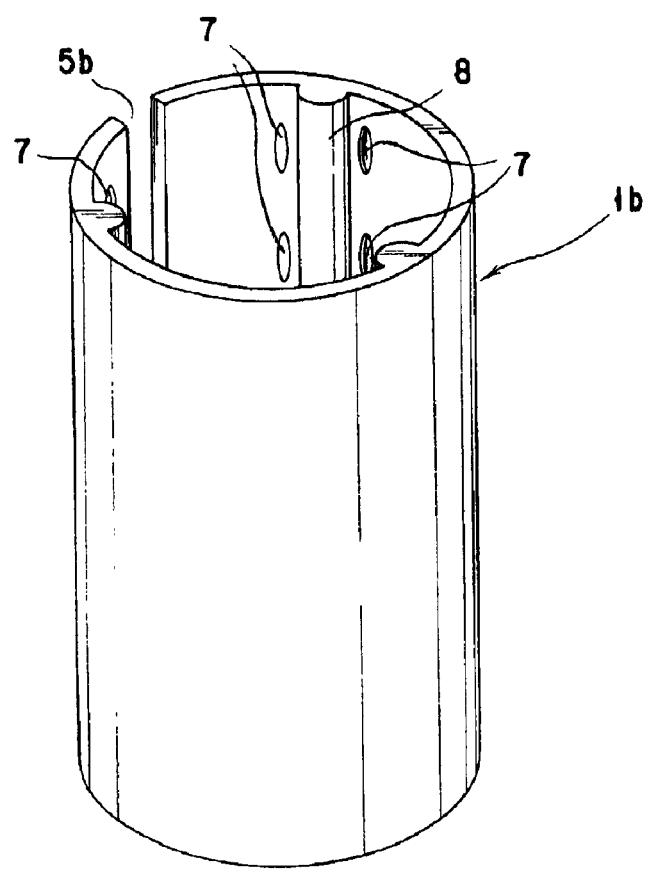
FIG. 15 is a schematic perspective view illustrating another embodiment of a sleeve as the hollow cast article having a slit according to the present invention.

FIG. 15 illustrates another embodiment of the sleeve manufactured according to the present invention. The sleeve 1b of this embodiment is provided with a slit 5b formed throughout the entire length thereof in its longitudinal direction from one end to the other thereof, as in the case of the sleeve 1a of the aforementioned embodiment, and further with three ridges (elongated elevations) 8 of a substantially semielliptic cross section formed symmetrically on the inside surfaces thereof respectively as continuously extended in the longitudinal direction thereof. The sleeve 1b of such structure is enabled to retain the inserted ferrules therein in a point-contact state nipped at points of the ridges and capable of more accurately retaining the abutted ferrules as mutually aligned to the axes of the ferrules (and consequently of the optical fibers being connected).

In such a sleeve 1b, a plurality of recessed parts 7 (or projected parts) may be formed on its inner circumferential surface along the three ridges (elongated elevations) 8 in the proximity thereof with predetermined intervals as shown in FIG. 15, besides the formation of projected parts or recessed parts in its slit faces as in the embodiments mentioned above. In this case, since the sleeve 1b is enabled to retain the ferrules to be inserted therein in a point-contact state nipped at points of the ridges (elongated elevations) 8, even if the recessed parts 7 (or projected parts) are formed on the inner circumferential surface except the ridges (elongated elevations) 8, they do not exert any harmful influence on the performance of the product (the retaining force and optical properties of ferrules as the optical connector part). Incidentally, in FIG. 15 a plurality of recessed parts 7 (or projected parts) may be formed on its inner circumferential surface along the slit 5b in the proximity thereof with predetermined intervals, instead of the above structure.

Figure 16:
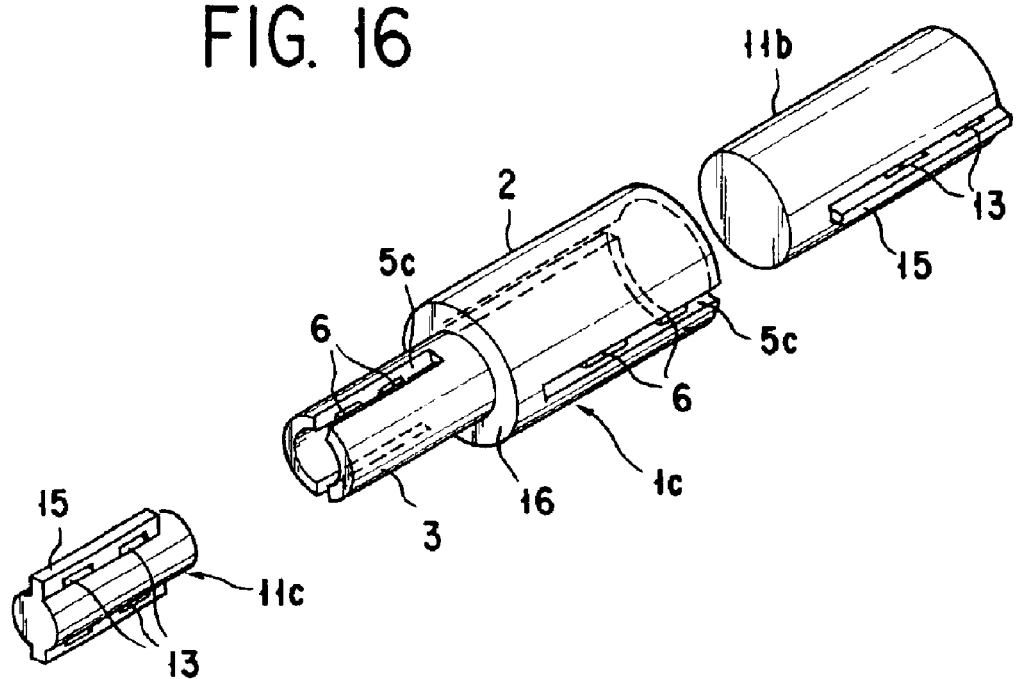
FIG. 16 is a schematic perspective view illustrating another embodiment of a conversion sleeve for the ferrules having different diameters as the hollow cast article having a slit according to the present invention, together with a core to be used.
Figure 17:
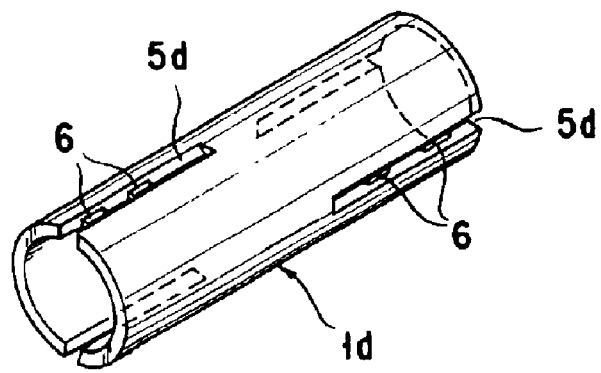
FIG. 17 is a schematic perspective view illustrating still another embodiment of a sleeve as the hollow cast article having a slit according to the present invention.

FIG. 16 illustrates another embodiment of the conversion sleeve for the ferrules having different diameters according to the present invention. On the other hand, FIG. 17 illustrates another embodiment of the sleeve according to the present invention. Both embodiments are the cases of the casting to be carried out in the state of abutting two cores.

First, in the case of the conversion sleeve 1c shown in FIG. 16, the casting is carried out by using a large diameter core 11b provided with slit forming parts 15 comprising, two elongated projected pieces formed symmetrically on both sides and a plurality (in the case of the illustrated embodiment, two) of recessed parts 13 formed on both sides of the slit forming parts 15 at predetermined intervals and a small diameter core 11c similarly provided with slit forming parts 15 comprising two elongated projected pieces formed symmetrically on both sides and a plurality (in the case of the illustrated embodiment, two) of recessed parts 13 formed on both sides of the slit forming parts 15 at predetermined intervals and arranging them in the state that the large diameter core 11b abuts against the small diameter core 11c in such a manner that the slit forming parts 15 of the large diameter core 11b are perpendicular to the slit forming parts 15 of the small diameter core 11c.

By drawing out both the cores 11b, 11c to the opposite directions from the cast product after completion of the casting, there is obtained a conversion sleeve 1c for the ferrules having different diameters, which sleeve comprises the large diameter part 2 and the small diameter part 3 formed on opposite sides of the step part 16 at substantially the intermediate position, the large diameter part 2 having a pair of slits 5c symmetrically formed therein and the small diameter part 3 having a pair of slits 5c symmetrically formed therein so as to respectively extend in the axial direction independently in such a positional relation turned by 90°, and the projected parts 6 corresponding to the shape of the recessed parts 13 of the cores 11b, 11c mentioned above are formed in opposed end faces of the respective slits.

In case the slits 5c formed in the large diameter part 2 and the slits 5c formed in the small diameter part 3 are respectively independent as in this embodiment, it is possible to elastically hold the ferrules of different diameters to be fitted therein respectively with uniform clamping force by properly adjusting the wall thickness and the slit width.

On the other hand, the sleeve 1d shown in FIG. 17 may be manufactured in the same way as mentioned above except that the cores to be abutted have the same outside diameter. By drawing out both the cores to the opposite directions from the cast product after completion of the casting, there is obtained a sleeve 1d having a pair of slits 5d symmetrically formed in one side and a pair of slits 5d symmetrically formed in the other side, respectively extending in the axial direction independently in such a positional relation turned by 90°, and the projected parts 6 corresponding to the shape of the recessed parts of the cores formed in opposed end faces of the respective slits.

Figure 18:
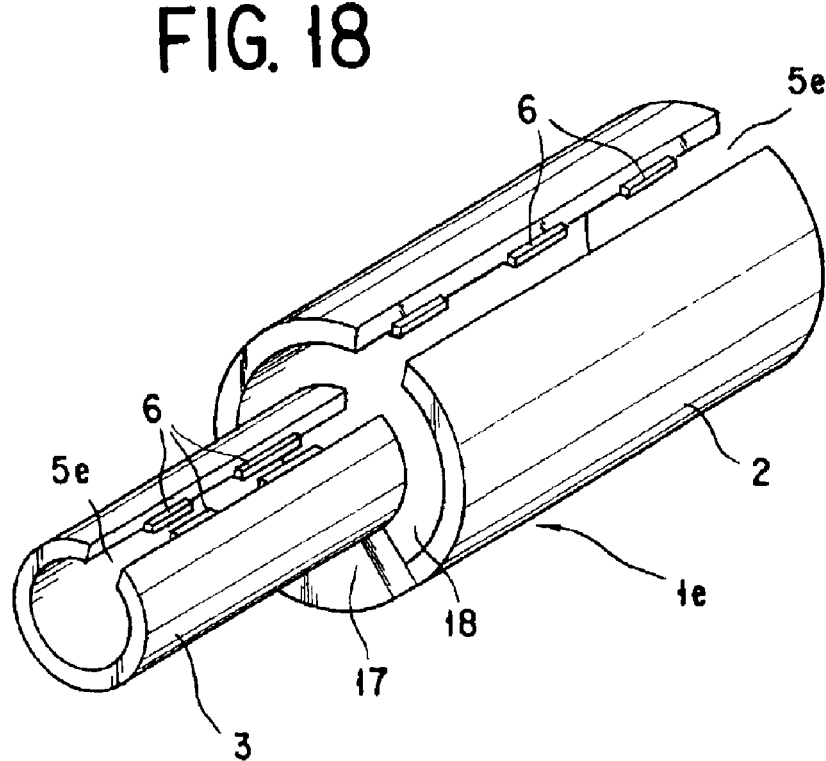
FIG. 18 is a schematic perspective view illustrating still another embodiment of a conversion sleeve for the ferrules having different diameters as the hollow cast article having a slit according to the present invention.

FIG. 18 illustrates still another embodiment of the conversion sleeve for the ferrules having different diameters according to the present invention. This conversion sleeve 1e has such structure that the large diameter part 2 and the small diameter part 3 is connected by a fan-shaped connecting part 17 and the large diameter part 2 and the small diameter part 3 have a slits 5e formed in their axial direction (longitudinal direction) from one end to the other thereof, respectively, each slit being provided with projected parts 6 (having the shape corresponding to the shape of the recessed parts of the core to be used) formed in opposed end faces of the respective slits 5. Accordingly, since the slit 5e formed in the large diameter part 2 is completely independent from the slit 5e formed in the small diameter part 3, the stable axial connection of the ferrules having different diameters can be attained with high axial alignment accuracy.

Though the size of the fan-shaped connecting part 17 has only to satisfy the requirement that this connecting part be capable of connecting and supporting the large diameter part 2 and the small diameter part 3 with sufficient strength, it is generally preferred that the angle of the fan shape be not less than about ⅓ and not more than about ½ of the total angle of the circumference (360°). Since an opening 18 is formed in the remaining angle portion of this connecting part 17, even if the degree of opening of the slit 5e in the large diameter part is somewhat different from that in the small diameter part, one opening degree does not exert harmful influence on the other. This opening 18 also functions as an air relief portion and a connecting state inspection window when the ferrules are inserted into the sleeve.

Figure 19:
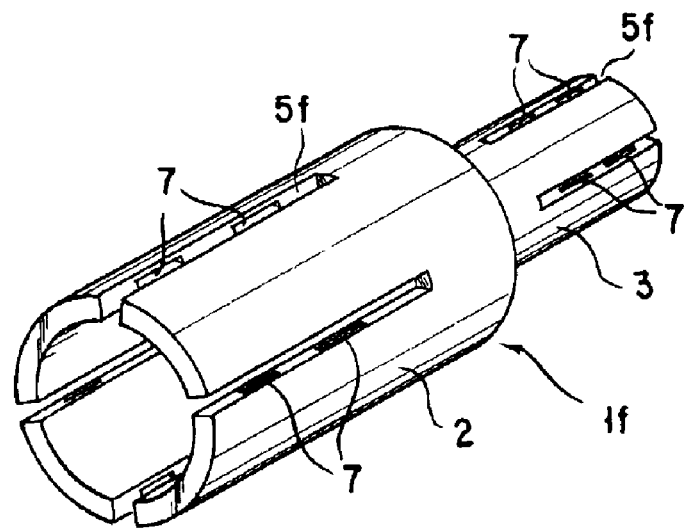
FIG. 19 is a schematic perspective view illustrating yet another embodiment of a conversion sleeve for the ferrules having different diameters as the hollow cast article having a slit according to the present invention.

FIG. 19 illustrates still further embodiment of the conversion sleeve for the ferrules having different diameters according to the present invention, which is a modification of the conversion sleeve shown in FIG. 16.

That is to say, in the conversion sleeve 1f shown in FIG. 19, the large diameter part 2 and the small diameter part 3 have four slits 5f formed symmetrically and independently in their axial direction from one end to the other thereof, respectively, each slit being provided with two recessed parts 7 (having the shape corresponding to the shape of the projected parts of the core to be used) formed in opposed end faces of the respective slits.

Figure 20:
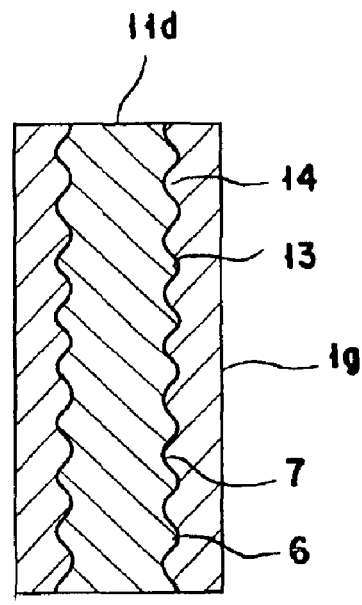
FIG. 20 is a fragmentary cross-sectional view schematically illustrating the relation between a core member and another embodiment of the sleeve of the present invention after completion of the casting.
Figure 21:
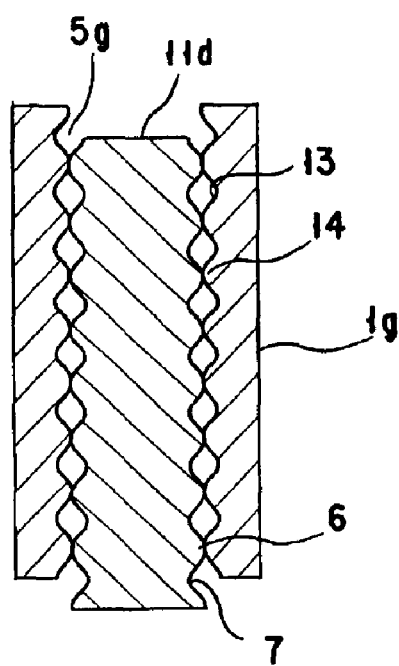
FIG. 21 is a fragmentary cross-sectional view schematically illustrating the state of the core in the course of drawing from the sleeve after completion of the casting in the embodiment shown in FIG. 20.

FIGS. 20 and 21 illustrate fragmentarily and schematically the state of the core in the course of drawing from the sleeve after completion of the casting in another embodiment of the present invention.

When the core 11d is lifted after completion of the casting, since the recessed parts 13 and the projected parts 14 are formed in the slit forming part of the core 11d in gently corrugated profile as shown in FIG. 20, the core runs up on the projected parts 6 of the corrugated part of the sleeve 1g comprising the projected parts 6 and the recessed parts 7 formed during the casting in conformity with the corrugated profile of the core and the slit 5g is opened due to the elasticity of the hollow cast product. As a result, since a gap is formed between the surface of the core 11d and the inner surface of the sleeve 1g, the core 11d can be relatively easily drawn from the cast product and the adhesion of the casting material to the surface of the core is effectively prevented.

Figure 22:
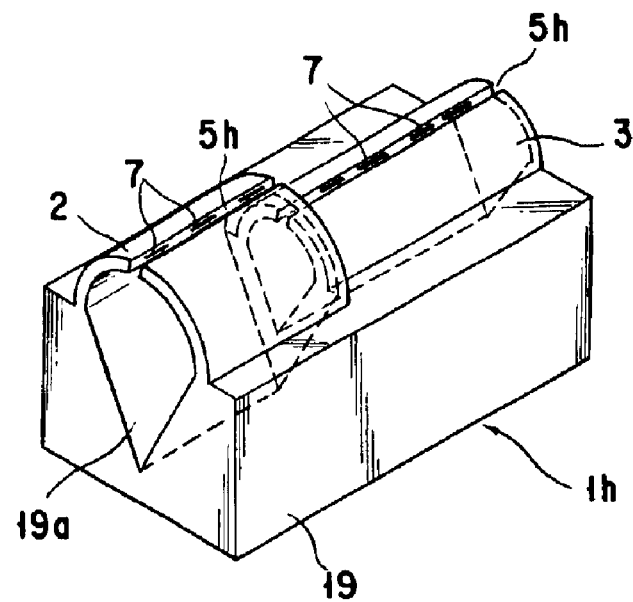
FIG. 22 is a schematic perspective view illustrating still another embodiment of a conversion sleeve for the ferrules having different diameters as the hollow cast article having a slit according to the present invention.

FIG. 22 illustrates yet another embodiment of the conversion sleeve for the ferrules having different diameters according to the present invention. This conversion sleeve 1h comprises a base part 19 having a V-groove 19a comprising a shallow groove portion and a deep groove portion, the large diameter part 2 and the small diameter part 3 each having a longitudinally divided half-cylindrical shape and integrally formed on the base part so as to cover the V-groove 19a mentioned above. Further, the large diameter part 2 and the small diameter part 3 have a slits 5h formed at the upper part in their axial direction (longitudinal direction) from one end to the other thereof, respectively, each slit 5h being provided with recessed parts 7 (having the shape corresponding to the shape of the projected parts of the core to be used) formed in opposed end faces of the respective slits. Accordingly, the slit 5h formed in the large diameter part 2 is completely independent from the slit 5h formed in the small diameter part 3.

Figure 23:
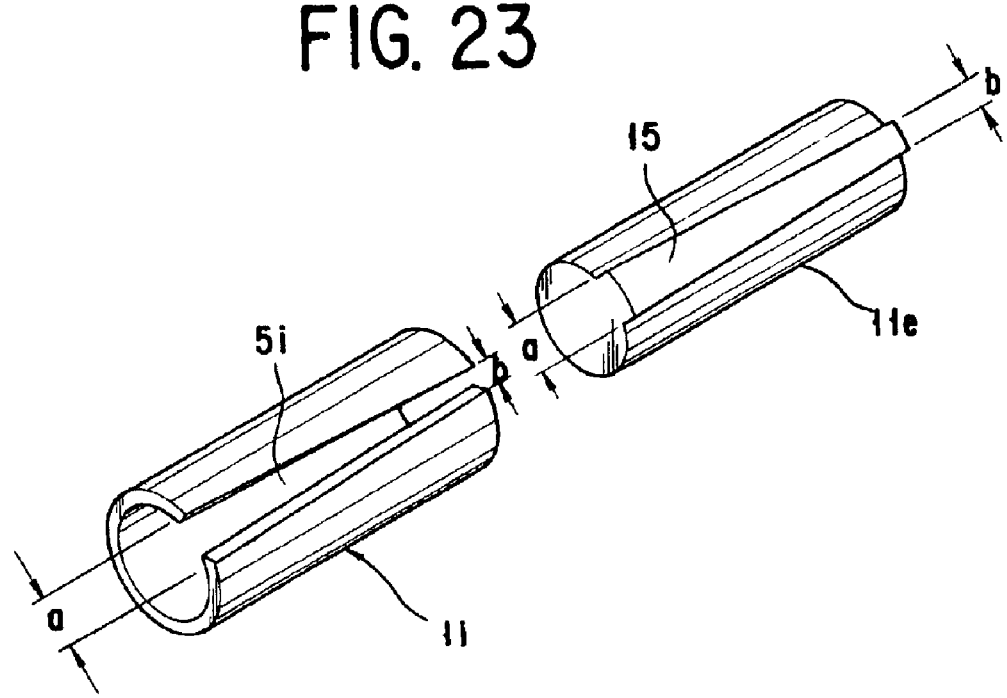
FIG. 23 is a schematic perspective view illustrating still another embodiment of a sleeve as the hollow cast article having a slit according to the present invention, together with a core to be used.

FIG. 23 illustrates yet another embodiment of the sleeve according to the present invention. In the case of this sleeve $1i$, the casting is carried out by using a core $11e$ provided with a slit forming part 15 having a shape of tapered ridge of which width decreases from one end of wider width to the other of narrow width. As a result, the similarly tapered sleeve $5i$ is formed in the cast sleeve $1i$. Since the width "a" at one end and the width "b" in the other end of the slit forming part 15 and of the slit $5i$ formed in the sleeve $1i$ have the relation of a>b, if the core $11e$ is drawn out from the hollow cast product in the direction toward the narrow width "b", the sleeve $1i$ is opened by the slit forming part 15 having the shape of tapered ridge mentioned above, thereby facilitating the drawing out of the core from the cast sleeve.

Incidentally, the present invention is not limited to the sleeves and conversion sleeves having the structures mentioned above and can be embodied in any modes insofar as they possess the characteristic feature of the present invention and further in any combinations of the embodiments mentioned above. Furthermore, the shape, the size and the like of the sleeve are not limited to the aforementioned forms, and various forms can be used for them according to the ferrules to be used. Further, it is easy to adjust the holding force to an arbitrary level by changing the wall thickness of the sleeve, by changing the width and the length of the slit, or by changing the number of slits.

Although the casting material to be used in the method of the present invention does not need to be limited to any particular substance but may be any of the materials which are used in the conventional casting, a substantially amorphous alloy containing an amorphous phase in a volumetric ratio of at least 50% may be preferably used. Particularly, the amorphous alloy having a composition represented by either one of the following general formulas (1) to (6) may be advantageously used.

$$M^1_a M^2_b Ln_c M^3_d M^4_e M^5_f \tag{1}$$

wherein $M^1$ represents either or both of the two elements, Zr and Hf; $M^2$ represents at least one element selected from the group consisting of Ni, Cu, Fe, Co, Mn, Nb, Ti, V, Cr, Zn, Al, and Ga; Ln represents at least one element selected from the group consisting of Y, La, Ce, Nd, Sm, Gd, Tb, Dy, Ho, Yb, and Mm (misch metal: aggregate of rare earth elements); $M^3$ represents at least one element selected from the group consisting of Be, B, C, N, and O; $M^4$ represents at least one element selected from the group consisting of Ta, W, and MQ; $M^5$ represents at least one element selected from the group consisting of Au, Pt, Pd, and Ag; and a, b, c, d, e, and f represent such atomic percentages as respectively satisfy $25 \leq a \leq 85$, $15 \leq b \leq 75$, $0 \leq c \leq 30$, $0 \leq d \leq 30$, $0 \leq e \leq 15$, and $0 \leq f \leq 15$.

$$Al_{100-g-h-i} Ln_g M^6_h M^3_i \tag{2}$$

wherein Ln represents at least one element selected from the group consisting of Y, La, Ce, Nd, Sm, Gd, Tb, Dy, Ho, Yb, and Mm; $M^6$ represents at least one element selected from the group consisting of Ti, V, Cr, Mn, Fe, Co, Ni, Cu, Zr, Nb, Mo, Hf, Ta, and W; $M^3$ represents at least one element selected from the group consisting of Be, B, C, N, and O; and g, h, and i represent such atomic percentages as respectively satisfy $30 \leq g \leq 90$, $0 < h \leq 55$, and $0 \leq i \leq 10$.

$$Mg_{100-p} M^7_p \tag{3}$$

wherein $M^7$ represents at least one element selected from the group consisting of Cu, Ni, Sn, and Zn; and p represents an atomic percentage falling in the range of $5 \leq p \leq 60$.

$$Mg_{100-q-r} M^7_q M^8_r \tag{4}$$

wherein $M^7$ represents at least one element selected from the group consisting of Cu, Ni, Sn, and Zn; $M^8$ represents at least one element selected from the group consisting of Al, Si, and Ca; and q and r represent such atomic percentages as respectively satisfy $1 \leq q \leq 35$ and $1 \leq r \leq 25$.

$$Mg_{100-q-s} M^7_q M^9_s \tag{5}$$

wherein $M^7$ represents at least one element selected from the group consisting of Cu, Ni, Sn, and Zn; $M^9$ represents at least one element selected from the group consisting of Y, La, Ce, Nd, Sm, and Mm; and q and s represent such atomic percentages as respectively satisfy $1 \leq q \leq 35$ and $3 \leq s \leq 25$.

$$Mg_{100-q-r-s} M^7_q M^8_r M^9_s \tag{6}$$

wherein $M^7$ represents at least one element selected from the group consisting of Cu, Ni, Sn, and Zn; $M^8$ represents at least one element selected from the group consisting of Al, Si, and Ca; $M^9$ represents at least one element selected from the group consisting of Y, La, Ce, Nd, Sm, and Mm; and q, r, and s represent such atomic percentages as respectively satisfy $1 \leq q \leq 35$, $1 \leq r \leq 25$, and $3 \leq s \leq 25$.

The aforementioned alloys are disclosed in detail in JP-2001-1130,A, the teachings of which are hereby incorporated by reference.

Besides the amorphous alloys mentioned above, any amorphous alloys heretofore known in the art such as, for example, amorphous alloys disclosed in JP-10-186176, JP-10-311923, JP-11-104281, and JP-11-189855 may be used.

As a metallic material used for the production of the hollow cast article having a slit according to the present invention, alloys for die casting such as Al-based alloys, Mg-based alloys, Zn-based alloys, Fe-based alloys, Cu-based alloys, titanium alloys and the like may be advantageously used besides amorphous alloys mentioned above. Such alloys for die casting are used in the conventional casting process and inexpensive in comparison with ceramics commonly used for the production of the optical connector parts and amorphous alloys. By using such alloys for die casting, the optical connector parts may be easily produced by molding the alloy under pressure in a metal mold by means of a die casting machine.

Moreover, any materials such as synthetic resins heretofore used for the production of the optical connector parts may also be used.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The disclosure in Japanese Patent Application No. 2001-311049 of Oct. 9, 2001 is incorporated here by reference. This Japanese Patent Application describes the invention described hereinabove and, claimed in the claims appended hereinbelow and provides the basis for a claim of priority for the instant invention under 35 U.S.C. 119.

What is claimed is:

1. A hollow cast article having a slit, characterized in that a plurality of recessed parts or projected parts are formed in at least one of a slit part and an inner peripheral part of the article at intervals in the longitudinal direction of said article.

2. The hollow cast article having a slit according to claim 1, wherein said article is a sleeve to be used for connecting optical connector ferrules.

3. The hollow cast article having a slit according to claim 2, wherein said sleeve has a slit formed throughout the entire length in the longitudinal direction thereof.

4. The hollow cast article having a slit according to claim 2, wherein said sleeve has a plurality of slits separated from each other and formed in the longitudinal direction thereof.

5. The hollow cast article having a slit according to claim 1, wherein said article is a conversion sleeve to be used for connecting opposed optical connector ferrules having different diameters.

6. The hollow cast article having a slit according to claim 5, wherein said conversion sleeve comprises a large diameter part and a small diameter part integrally formed with said large diameter part and has a slit formed throughout the entire length of said large diameter part and said small diameter part in the longitudinal direction thereof.

7. The hollow cast article having a slit according to claim 5, wherein said conversion sleeve comprises a large diameter part and a small diameter part integrally formed with said large diameter part and each of said large diameter part and said small diameter part has at least one slit separated form each other and formed in the longitudinal direction thereof.

8. The hollow cast article having a slit according to claim 1, wherein said article is formed of a metal.

9. The hollow cast article having a slit according to claim 1, wherein said article is formed of an amorphous alloy.

10. A hollow cast article having a slit, characterized in that said slit is formed in a tapered shape such that the width of the slit gradually changes from a large width at one end to a small width at the other end of the article in the longitudinal direction of said article.

11. The hollow cast article having a slit according to claim 10, wherein said article is a sleeve to be used for connecting optical connector ferrules.

12. The hollow cast article having a slit according to claim 11, wherein said sleeve has a slit formed throughout the entire length in the longitudinal direction thereof.

13. The hollow cast article having a slit according to claim 10, wherein said article is formed of a metal.

14. The hollow cast article having a slit according to claim 10, wherein said article is formed of an amorphous alloy.

15. A method for the production of a hollow cast article having a slit, comprising:
placing in a mold a core provided with at least one of a projected part and a recessed part formed in at least one of a slit forming part and an outer peripheral part thereof;
injecting a molten material into the mold to cast a hollow product; and
drawing out the core from the hollow cast product while opening the hollow cast product by means of said projected part or/and said recessed part.

16. The method according to claim 15, wherein said core comprises a large diameter part and a small diameter part integrally formed with said large diameter part and has the slit forming part formed throughout the entire length of said large diameter part and said small diameter part in the longitudinal direction thereof, and the drawing out of the core from the hollow cast product is carried out in the direction to the large diameter part to open the hollow cast product by means of said projected part or/and said recessed part.

17. The method according to claim 15, wherein said core comprises a pair of a large diameter core and a small diameter core each having a slit forming part formed in the longitudinal direction thereof, and the drawing out of the cores from the hollow cast product is carried out in the opposite directions to open the hollow cast product by means of said projected part or/and said recessed part.

18. The method according to claim 15, wherein a core provided with a slit forming part of a taper-shaped ridge having the width gradually decreasing from a large width at one end to a small width at the other end is used, and the drawing out of the core from the hollow cast product is carried out in the direction to said other end of small width to open the hollow cast product by means of said slit forming part of the taper-shaped ridge.

19. An apparatus for the production of a hollow cast article having a slit, characterized by comprising a split mold provided with at least one cavity which defines an outer shape of said article and a core slidably disposed in said cavity of the mold in the longitudinal direction thereof, wherein said core is provided with at least one of a projected part and a recessed part or a taper-shaped ridge formed in at least one of a slit forming part and an outer peripheral part thereof.

20. The apparatus according to claim 19, wherein said core comprises a large diameter part and a small diameter part integrally formed with said large diameter part and has the slit forming part formed throughout the entire length of said large diameter part and said small diameter part in the longitudinal direction thereof.

21. The apparatus according to claim 19, wherein said core comprises a pair of a large diameter core and a small diameter core each having the slit forming part formed in the longitudinal direction thereof.

22. The apparatus according to claim 19, wherein said slit forming part is a taper-shaped ridge having a width gradually decreasing from a large width at one end to a small width at the other end.

23. The hollow cast article having a slit according to claim 1, wherein said plurality of recessed parts or projected parts are formed in at least one of the slit part and the inner peripheral part of the article at different intervals in the longitudinal direction of said article.

24. The hollow cast article having a slit according to claim 1, wherein said plurality of recessed parts or projected parts have different lengths.

* * * * *